Patented Feb. 13, 1951

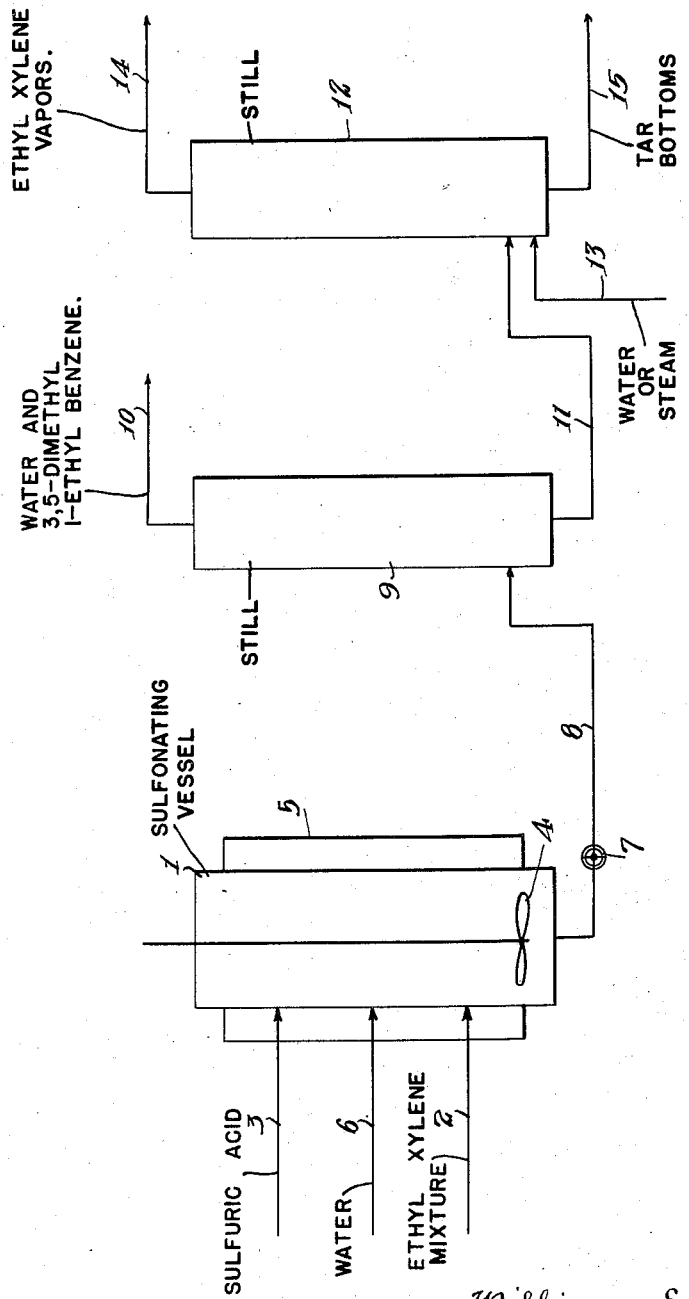

2,541,959

UNITED STATES PATENT OFFICE 2,541,959

PROCESS OF SEPARATING THE 3,5-DIMETH-YL 1-ETHYL BENZENE FROM OTHER ETHYL XYLENES

William E. Elwell, Berkeley, Calif., assignor to California Research Corporation, San Francisco, Calif., a corporation of Delaware Application July 1, 1948, Serial No. 36,359

8 Claims. (Cl. 260—674)

This invention relates to a process for separating the 3,5-dimethyl 1-ethyl benzene from mixtures with other xylene isomers by sulphonation and selective hydrolysis of an ethyl xylene fraction. Ethyl xylenes have boiling points so closely related as to make their separation in many cases impractical, if not impossible, to carry out by distillation processes. Thus, for example, the boiling points of the 3,5-dimethyl 1-ethyl benzene, the 2,5-dimethyl 1-ethyl benzene, the 2,4-dimethyl 1-ethyl benzene, and the 2,6-dimethyl 1-ethyl benzene are, respectively, 183.75° C., 186.91° C., 188.41° C., and 189.75° C.

The present invention embodies the discovery that separation of the 3,5-dimethyl 1-ethyl benzene from other ethyl xylenes such as the 2,4-dimethyl 1-ethyl benzene, the 2,5-dimethyl 1-ethyl benzene, and the 2,6-dimethyl 1-ethyl benzene may be effected by first sulphonating the ethyl xylenes and then subjecting the sulphonated mixture to hydrolysis preferably accompanied by simultaneous distillation. It appears that the sulphonated product obtained from the 3,5-dimethyl 1-ethyl benzene undergoes hydrolysis to reform the 3,5-dimethyl 1-ethyl benzene readily at comparatively low temperatures and under conditions where the products of sulphonation of the other ethyl xylenes do not undergo hydrolysis. It is thereby rendered possible to separate in substantial purity the 3,5-dimethyl 1-ethyl benzene from a mixture of the same with other xylenes by first subjecting the admixture to sulphonation followed by a selective hydrolysis.

The process of the present invention, together with further objects and advantages of the invention, will be fully understood from the following description of a preferred example of the invention as carried out in the apparatus illustrated in the accompanying drawings.

In the drawings the figure represents a diagrammatic view of a suitable apparatus in which the process of the present invention may be conducted, in which drawing, however, for the sake of clarity and simplicity, there have been omitted certain details, such as pumps, valves, measuring means, heat exchangers, coolers, refluxing apparatus, flow meters and like appurtenances, as will be readily supplied by one skilled in the art. Likewise, for a low corrosion loss of lines, vessels and columns, special materials of construction should be used. These are not referred to since they may be supplied by those skilled in the art without detailed instructions.

In the process as illustrated in the drawings, a mixture of ethyl xylenes enters the sulphonation vessel 1 through a line 2. Into the sulphonation vessel 1 there is introduced sulphuric acid through line 3. The sulphonation vessel 1 is preferably provided with a suitable stirring or agitating means such as is indicated at 4, and is jacketed as indicated at 5 for alternately heating and subsequently cooling the reaction mixture.

In the sulphonating vessel 1 sufficient concentrated sulphuric acid is added to effect sulphonation of all the ethyl xylenes introduced. The strength of sulphuric acid used may be any strength usual in sulphonation, but I prefer to employ sulphuric acid of a specific gravity of 1.84. The sulphuric acid of such strength may, for example, be added to the ethyl xylenes in proportions of about 1.8 to one part by weight of acid to ethyl xylene. This is an excess of sulphuric acid over that required by the reaction, but an excess is desirable to insure complete sulphonation of the reaction mixture.

The reaction may, if desired, be carried out in a batch process, under which conditions the ethyl xylene is first heated to a suitable temperature, such as about 110° C., before the introduction of the sulphuric acid, which is preferably gradually added for a suitable period of time, such as about an hour. After the completion of the introduction of the sulphuric acid, it is preferable to raise the temperature of the reaction mixture somewhat, such as, for example, to 140° C., and maintain it at an elevated temperature for a period of time such as 1½ hours in order to insure completion of the sulphonation reaction.

After the completion of the sulphonation reaction, it is preferable to first cool the reaction mixture and then add a suitable quantity of water for effecting hydrolysis. The water may be introduced through the line 6. The amount of water added is generally equal to about one-third or one-fourth of the weight of sulphuric acid employed. The mixture is then withdrawn from the vessel through a valve 7 and passed by line 8 into a still 9. In the still 9 the admixture is subjected to distillation to distill the water and the 3,5-dimethyl 1-ethyl benzene formed by hydrolysis of the sulphonated mixture. The bulk of the material introduced into still 9 is removed at a temperature of about 114° C., but the distillation temperature may be carried up to a temperature of about 160° C. at the end of the process. The water and the 3,5-dimethyl 1-ethyl benzene are removed from the still 9 as an overhead through a line 10.

The bottoms of the still are withdrawn from line 11 and consist of sulphonated ethyl xylenes derived from the ethyl xylenes other than the 3,5-dimethyl 1-ethyl benzene which were contained in the feed material introduced in line 2. The bottoms also may include tar. These bottoms may be disposed of as desired, but I have indicated the bottoms as being withdrawn by line 11 and passed to a second still 12. In the still 12, by the use of high temperature and/or pressure, a part or all of the remaining sulphonated ethyl xylenes may be hydrolyzed to the ethyl xylenes by the introduction of steam or water through line 13. The produced ethyl xylenes may be withdrawn as vapors from line 14 and the tar withdrawn as a bottom through line 15.

In the process of the present invention the ethyl xylenes which are introduced into the sulphonating vessel 1 through line 2 may consist of any desired mixture of ethyl xylenes including the 3,5-dimethyl 1-ethyl benzene and any one or combination of any of the other ethyl xylenes including the 2,4-dimethyl 1-ethyl benzene, the 2,5-dimethyl 1-ethyl benzene, and the 2,6-dimethyl 1-ethyl benzene. As an example of the process of the present invention, in one operation of the process the ethyl xylene admixture fed to the sulphonation vessel 1 through line 2 constituted an admixture analyzing substantially 47% of the 3,5-dimethyl 1-ethyl benzene, 39% of the 2,4-dimethyl 1-ethyl benzene, 11% of the 2,6-dimethyl 1-ethyl benzene, and 3% of the 2,5-dimethyl 1-ethyl benzene. This ethyl xylene admixture was subjected to the process at substantially the conditions previously given. When the sulphonated product was subjected to hydrolysis and distillation in the still, two cuts were taken continuously and analyzed for density and refractive index. The density of the ethyl xylene cuts obtained from line 10 of the condensate remains substantially constant at about the density of 0.8648 and refractive index of 1.4980, which are the density and refractive index of the desired 3,5-dimethyl 1-ethyl benzene, until substantially the complete recovery of this product has been effected, thus establishing that this component of the mixture was capable of being separated in substantial purity in the process from the other ethyl xylenes of the admixture process.

While the particular example of the process herein described is well adapted to carry out the objects of the invention, it is to be understood that various modifications of the process may be employed and this invention is of the scope set forth in the appended claims.

I claim:

1. A process of separating the 3,5-dimethyl 1-ethyl benzene from other ethyl xylenes, including the 2,4-dimethyl 1-ethyl benzene, the 2,5-dimethyl 1-ethyl benzene, and the 2,6-dimethyl 1-ethyl benzene, which process comprises subjecting a mixture of the 3,5-dimethyl 1-ethyl benzene and at least one such other ethyl xylene to a sulphonating reaction with sulphuric acid in which substantially all of the ethyl xylenes in the mixture are sulphonated, thereafter adding water and subjecting the sulphonated reaction mixture to hydrolysis in which the sulphonated product of the 3,5-dimethyl 1-ethyl benzene is hydrolyzed while the other sulphonated ethyl xylenes remain substantially unhydrolyzed the temperature of hydrolyzation being below about 160° C., and separating such ethyl xylene from the sulphonated materials.

2. A process of separating the 3,5-dimethyl 1-ethyl benzene from mixtures with other ethyl xylenes, including the 2,4-dimethyl 1-ethyl benzene, the 2,5-dimethyl 1-ethyl benzene, and the 2,6-dimethyl 1-ethyl benzene, which comprises reacting a mixture of such 3,5-dimethyl 1-ethyl benzene and at least one other of such ethyl xylenes with sulphuric acid in order to sulphonate substantially all the ethyl xylenes, then adding water and subjecting the sulphonated reaction mixture to hydrolysis so as to hydrolyze substantially only the sulphonated material derived from the 3,5-dimethyl 1-ethyl benzene the temperature of hydrolyzation being between about 114° C. and 160° C. and distilling such ethyl xylene from the remaining unhydrolyzed sulphonated material.

3. A method of separating the 3,5-dimethyl 1-ethyl benzene from mixtures of the group of ethyl xylenes including the 2,4-dimethyl 1-ethyl benzene, the 2,5-dimethyl 1-ethyl benzene, and the 2,6-dimethyl 1-ethyl benzene, which comprises sulphonating substantially entirely an admixture of the 3,5-dimethyl 1-ethyl benzene with at least one of such other xylenes by reaction with sulphuric acid, thereafter hydrolyzing the sulphonated mixture by the addition of water at a temperature below the hydrolyzation temperature of the sulphonated materials other than the sulphonated 3,5-dimethyl 1-ethyl benzene, and hydrolyzing said latter material the temperature of hydrolyzation being below about 160° C. and separating such ethyl xylene from the sulphonated materials.

4. A method of separating the 3,5-dimethyl 1-ethyl benzene from mixtures of the group of ethyl xylenes including the 2,4-dimethyl 1-ethyl benzene, the 2,5-dimethyl 1-ethyl benzene, and the 2,6-dimethyl 1-ethyl benzene, which comprises sulphonating substantially entirely an admixture of the 3,5-dimethyl 1-ethyl benzene with at least one of such other xylenes by the addition of reaction with sulphuric acid, thereafter hydrolyzing the sulphonated mixture by the addition of water at a temperature below the hydrolyzation temperature of all but the sulphonated 3,5-dimethyl 1-ethyl benzene, hydrolyzing said latter material from the sulphonated residue the temperature of hydrolyzation being between about 114° C. and 160° C., and separating the same by distillation from the sulphonated residue.

5. A method of separating the 3,5-dimethyl 1-ethyl benzene from mixtures of the group of ethyl xylenes including the 2,4-dimethyl 1-ethyl benzene, the 2,5-dimethyl 1-ethyl benzene, and the 2,6-dimethyl 1-ethyl benzene, which comprises sulphonating substantially entirely an admixture of the 3,5-dimethyl 1-ethyl benzene with at least one of such other xylenes by reaction with sulphuric acid, thereafter hydrolyzing the sulphonated mixture by the addition of water at a temperature below the hydrolyzation temperature of all but the sulphonated 3,5-dimethyl 1-ethyl benzene, and separating by hydrolyzing said latter material from the sulphonated residue, the temperature of hydrolyzation being below about 160° C.

6. A method of separating the 3,5-dimethyl 1-ethyl benzene from mixtures of the group of ethyl xylenes including the 2,4-dimethyl 1-ethyl benzene, the 2,5-dimethyl 1-ethyl benzene, and the 2,6-dimethyl 1-ethyl benzene, which comprises sulphonating substantially entirely an admixture of the 3,5-dimethyl 1-ethyl benzene with at least one of such other ethyl xylenes, thereafter simultaneously hydrolyzing and distilling the lower boiling fraction consisting principally of 3,5-dimethyl 1-ethyl benzene from the sulphonated residue, the temperature of hydrolyzation and distillation being below about 160° C.

7. A method of separating the 3,5-dimethyl 1-ethyl benzene from mixtures of the group of ethyl xylenes including the 2,4-dimethyl 1-ethyl benzene, the 2,5-dimethyl 1-ethyl benzene, and the 2,6-dimethyl 1-ethyl benzene, which comprises sulphonating substantially entirely an admixture of the 3,5-dimethyl 1-ethyl benzene with at least one of such other xylenes by reaction with about 1.8 parts by weight of concentrated sulphuric acid to about 1 part by weight of ethyl xylene admixture, thereafter hydrolyzing the sulphonated mixture by the addition of water equal to from about ¼ to ⅓ of the weight of sulphuric acid at a temperature below the hydrolyzation temperature of all but the sulphonated 3,5-dimethyl 1-ethyl benzene, and separating by hydrolyzing said latter material from the sulphonated residue, the temperature of hydrolyzation being below about 160° C.

8. A process for separating 3,5-dimethyl 1-ethyl benzene from mixtures of ethyl xylenes containing 3,5-dimethyl 1-ethyl benzene which comprises sulphonating said mixture under conditions adapted to effect substantially complete sulphonation of the ethyl benzenes and digesting the reaction product of the sulphonation step with water at an elevated temperature below about 160° C. whereby the sulphonated 3,5-dimethyl 1-ethyl benzene is selectively hydrolyzed.

WILLIAM E. ELWELL.

REFERENCES CITED

The following references are of record in the file of this patent:

UNITED STATES PATENTS

| Number | Name | Date |
| --- | --- | --- |
| 2,348,329 | Cole et al. | May 9, 1944 |